United States Patent [19]

Schwartz, Jr.

[11] Patent Number: 5,270,017

[45] Date of Patent: Dec. 14, 1993

[54] APPARATUS FOR MAKING CHEMICALLY ACTIVATED CARBON

[75] Inventor: Frank R. Schwartz, Jr., Galena, Ohio

[73] Assignee: Westvaco Corporation, New York, N.Y.

[21] Appl. No.: 961,835

[22] Filed: Oct. 16, 1992

Related U.S. Application Data

[62] Division of Ser. No. 891,734, Jun. 1, 1992, Pat. No. 5,212,144.

[51] Int. Cl.$^5$ .................. F26B 11/02; F26B 11/04; F27B 7/08; F27B 7/36

[52] U.S. Cl. .................. 422/209; 34/133 M; 34/133 Q; 34/134; 34/135; 110/246; 432/113

[58] Field of Search .............. 422/150, 151, 154, 209, 422/210; 34/135, 138, 133 M, 133 P, 133 Q, 134; 201/36; 202/133, 135, 136; 110/226, 246; 432/107, 112; 502/423

[56] References Cited

U.S. PATENT DOCUMENTS

3,337,965  8/1967  Whitsel, Jr. .................. 34/135
3,432,397  3/1969  Berg .......................... 201/36
4,891,892  1/1990  Narang ....................... 34/133 P Primary Examiner—Robert J. Warden
Assistant Examiner—L. M. Crawford
Attorney, Agent, or Firm—Francis T. Kremblas, Jr.

[57] ABSTRACT

An improved apparatus and method for the manufacture of activated carbon wherein a carbonaceous raw material impregnated with a chemical activating agent is treated by controlling the rate of heat transfer to the particles via indirect heating of the activation furnace and simultaneously introducing a flow of independently controlled sweep gas at spaced intervals along the path of travel of the particles through the furnace to more precisely control the activation reaction and the level of densification of the particles during certain stages of treatment. In a more preferred embodiment, the particles are processed in a plurality of treatment stages related to the rate of evolution of water and/or the evolution of water and the chemical activating agent and the rates of heat transfer and the volume flow rate of sweep gas are closely controlled relative to achieving predetermined levels of densification of the particles during each treatment stage and selected levels of activation properties in the end product.

4 Claims, 5 Drawing Sheets

FIG 1

RELATIONSHIP BETWEEN FURNACE HEATING RATES AND AIR SWEEP GAS FLOW RATES
IN THE FIRST STAGE VERSUS DENSIFICATION OF PARTICLES

| RUN NO. | HEATING RATE | AIR RATE | FINAL BED TEMP. | STAGE TIME MIN. | FURNACE PRODUCT $H_2O$ | APPARENT DENSITY FURNACE AS IS | APPARENT DENSITY PRODUCT DB | APPARENT DENSITY BEADS, DB | DENSIFICATION (2) | VOL/WT LOSS RATIO | FURNACE PRODUCT BED DESCRIPTION |
|---|---|---|---|---|---|---|---|---|---|---|---|
| 264 | 60° | 10-15 | 152° | 99 | 2.3 | 1.00 | .977 | .794 | 1.23 | 1.35 | LOOSE AND DRY |
| 265 | 60° | 10-15 | 155° | 105 | 1.8 | 1.00 | .982 | .769 | 1.28 | 1.39 | LOOSE AND DRY |
| 266 | 60° | 10-15 | 158° | 108 | 1.5 | .995 | .980 | .759 | 1.29 | 1.39 | LOOSE AND DRY |
| 267 | 60° | 15 | 159° | 107 | 1.6 | 1.01 | .994 | .785 | 1.27 | 1.39 | LOOSE AND DRY |
| 268 | 60° | 20 | 170° | 113 | 0.6 | 1.02 | 1.01 | .770 | 1.31 | 1.38 | LOOSE AND DRY |
| 269 | 60° | 20 | 160° | 105 | 1.1 | 1.00 | .989 | .770 | 1.28 | 1.41 | LOOSE AND DRY |
| 270 | 60° | 25 | 163° | 105 | 1.0 | 1.00 | .990 | .782 | 1.27 | 1.33 | LOOSE AND DRY |
| 273 | 80° | 15 | 169° | 93 | 1.3 | 1.02 | 1.01 | .779 | 1.30 | 1.43 | LOOSE AND DRY |
| 271 | 80° | 20 | 172° | 92 | 0.9 | 1.01 | 1.00 | .754 | 1.33 | 1.44 | LOOSE AND DRY |
| 277 | 80° | 20 | 166° | 90 | 1.1 | 1.01 | .999 | .774 | 1.29 | 1.41 | LOOSE AND DRY |
| 278 | 80° | 20 | 171° | 92 | 1.1 | 1.02 | 1.01 | .775 | 1.30 | 1.42 | LOOSE AND DRY |
| 279 | 80° | 20 | 166° | 89 | 0.9 | .992 | .983 | .752 | 1.31 | 1.47 | LOOSE AND DRY PATCH AT NORTH AND PATCH AT SOUTH |
| 272 | 80° | 25 | 163° | 87 | 1.3 | 1.01 | .997 | .783 | 1.27 | 1.39 | LOOSE AND DRY |
| 276 | 100° | 10 | 173° | 84 | 1.5 | .997 | .982 | .775 | 1.27 | 1.35 | LOOSE AND DRY |
| 275 | 100° | 15 | 173° | 82 | .9 | 1.02 | 1.01 | .770 | 1.31 | 1.42 | LOOSE AND DRY |
| 274 | 100° | 20 | 168° | 79 | 1.2 | 1.01 | .998 | .778 | 1.28 | 1.40 | LOOSE AND DRY |

(2) RATIO OF DB AD'S, FURNACE PRODUCT: RAW BEADS
(3) INITIAL BED TEMPERATURE 20°C

FIG 2

COMPOSITION
PARTS BY WEIGHT, DRY BASIS
WOODFLOUR 100.0
LIGNOSULFONATE BINDER 25.9
PHOSPHORIC ACID, 100% 157.2

FURNACING CONDITIONS
| | STAGE I | STAGE III |
|---|---|---|
| RAMP, °C/HR | 70° | 30°, 60°, 90°, 120° |
| SWEEP GAS TEMPERATURE, °C | 150° | 400° |
| STAGE ENDPOINT | 4% BOUND WATER | 22 = 495° |
| SWEEP GAS TYPE | AIR | STEAM - C.G. |
| % $O_2$ | 20.2% | 8.9% |
| % STEAM | 4% | 10.9% |
| SWEEP GAS, TOTAL LPM | 2.7 TP 25.4 | 10.0 LPM |

| LAB ROTARY RUN | HEATING RATE °C/HR | AIR RATE LPM | FINAL BED TEMP. | STAGE TIME MIN. (1) | FURNACE PRODUCT $H_2O$ | APPARENT DENSITY AD FURNACE AS IS | APPARENT DENSITY AD PRODUCT DB | APPARENT DENSITY AD BEADS DB | DENSIFICATION (2) | VOL/WT LOSS RATIO | AD | BUTANE % W/W | CARBON PROPERTIES ACT. % W/V | BWC (3) | VOLATILE | BALL PAN | TOTAL P.VOL |
|---|---|---|---|---|---|---|---|---|---|---|---|---|---|---|---|---|---|
| STAGE II RUNS | | | | | | | | | | | | | | | | | |
| 870 | 70° | 5.0 | 315° | 106 | 0 | 1.03 | 1.03 | .715 | 1.44 | 1.32 | .506 | 18.6 | 9.4 | -- | 20.4 | -- | .73 |
| 873 | "" | 7.5 | 317° | 106 | 0 | 1.04 | 1.04 | .705 | 1.48 | 1.33 | .485 | 20.0 | 9.7 | -- | 20.7 | -- | .78 |
| 869 | 100° | 7.5 | 310° | 75 | 0 | 1.02 | 1.02 | .717 | 1.42 | 1.31 | .563 | 15.3 | 8.6 | -- | 21.5 | -- | .63 |
| 871 | 130° | 10.0 | 302° | 58 | 0 | 1.02 | 1.02 | .706 | 1.44 | 1.32 | .653 | 6.3 | 4.1 | -- | 24.2 | -- | .39 |
| 872 | "" | 12.5 | 303° | 58 | 0 | 1.03 | 1.03 | .718 | 1.43 | 1.32 | .622 | 11.7 | 7.3 | -- | 22.7 | -- | .56 |
| RUNS ACTIVATED IN STAGE III | | | | | | | | | | | | | | | | | |
| 874 | 70° | 5.0 | 512° | 106 | 0 | 1.10 | 1.10 | .708 | 1.55 | 1.40 | .348 | 58.1 | 20.2 | 15.7 | 6.7 | 91.9 | 1.27 |
| 875 | "" | 7.5 | 512° | 106 | 0 | 1.21 | 1.21 | .699 | 1.73 | 1.61 | .352 | 58.6 | 20.6 | 15.9 | 6.3 | 91.5 | 1.24 |
| 732 | 100° | 7.5 | 512° | 70 | 0 | -- | -- | .722 | -- | -- | .359 | 56.1 | 20.1 | 15.8 | 7.0 | 85.4 | 1.26 |
| 883 | "" | 10.0 | 508° | 75 | 0 | 1.11 | 1.11 | .710 | 1.55 | 1.37 | .363 | 54.1 | 19.6 | 15.5 | 5.9 | 95.1 | 1.19 |
| 876 | 130° | 10.0 | 508° | 58 | 0 | -- | -- | .722 | -- | -- | .367 | 52.2 | 19.2 | 15.3 | 5.0 | 93.8 | 1.15 |
| 877 | "" | 12.5 | 509° | 58 | 0 | -- | -- | .717 | -- | -- | .364 | 52.8 | 19.2 | 15.2 | 5.7 | 93.7 | 1.18 |

(1) STAGE II TIME FROM 4% BOUND WATER TO FURNACE AIR SPACE TEMPERATURE OF 315°C.
(2) RATIO OF DB AD'S, FURNACE PRODUCT: RAW BEADS
(3) RPD METHOD: 422 PURGE VOLUMES

FIG. 3

THE EFFECT OF HEATING RATES IN STAGE III UPON ACTIVATION PROPERTIES USING A COMBUSTION GAS-AIR SWEEP GAS CONTAINING 8.9 VOLUME PERCENT OXYGEN AND 10.9 VOLUME PERCENT STEAM AT THE RATE OF 10 LITERS PER MINUTE

COMPOSITION, PARTS BY WEIGHT, DRY BASIS:
- WOODFLOUR: 100.0
- LIGNOSULFONATE BINDER: 25.7
- PHOSPHORIC ACID, 100%: 207.4

| RUN NO. | 704 | 705 | 706 | 707 | 708 |
|---|---|---|---|---|---|
| HEATING RATES(1) | 20°–335° 30°–370° 60°–400° 120°–495° | 20°–335° 60°–400° 120°–495° | 20°–335° 60°–370° 90°–400° 120°–495° | 20°–335° 90°–400° 120°–495° | 20°–335° 120°–495° |
| APPARENT DENSITY GM/ML | .286 | .292 | .291 | .296 | .303 |
| BUTANE ACTIVITY % W/W | 67.9 | 65.5 | 65.1 | 61.7 | 59.6 |
| BUTANE ACTIVITY % W/V | 19.4 | 19.1 | 18.9 | 18.3 | 18.1 |
| BUTANE RETENTIVITY, % W/W | 11.6 | 10.6 | 10.7 | 9.5 | 9.4 |
| BWC (RPD), % W/V(2) | 16.1 | 16.0 | 15.8 | 15.5 | 15.2 |
| VOLATILE CONTENT % W/W | 7.3 | 6.9 | 6.2 | 5.4 | 5.0 |
| TOTAL PORE VOL., ML/GM | 1.72 | 1.66 | 1.66 | 1.60 | 1.55 |
| BALL PAN HARDNESS, % | 73.5 | 85.1 | 67.9 | 75.4 | 79.1 |
| RAW BEAD DB AD, GM/ML | .762 | .764 | .770 | .765 | .767 |
| STAGE III TIME, MINUTES | 208 | 173 | 163 | 151 | 140 |

(1) THE RATE OF INCREASE OF THE FURNACE AIR SPACE TEMPERATURE IN °C PER HOUR, WHERE STAGE III BEGINS AT A FURNACE AIR SPACE TEMPERATURE OF 315°C.
(2) RPD METHOD: 422 PURGE VOLUMES (ASTM METHOD D5228:718 PURGE VOLUMES)

FIG. 4

THE EFFECT OF HEATING RATES IN STAGE III UPON ACTIVATION PROPERTIES USING A COMBUSTION GAS-AIR SWEEP GAS CONTAINING 8.9 VOLUME PERCENT OXYGEN AND 10.9 VOLUME PERCENT STEAM AT THE RATE OF 10 LITERS PER MINUTE

COMPOSITION, PARTS BY WEIGHT, DRY BASIS:  
WOODFLOUR 100.0  
LIGNOSULFONATE BINDER 25.7  
PHOSPHORIC ACID, 100% 207.4

| RUN NO. | 709 | 710 | 711 | 712 | 713 | 714 |
|---|---|---|---|---|---|---|
| HEATING RATES(1) | 20°-335° 120°-400° 150°-495° | 30°-335° 90°-400° 120°-495° | 40°-335° 90°-400° 120°-495° | 50°-335° 90°-400° 120°-495° | 60°-335° 90°-400° 120°-495° | 30°-335° 60°-370° 90°-400° 120°-495° |
| APPARENT DENSITY GM/ML | .305 | .312 | .317 | .321 | .319 | .310 |
| BUTANE ACTIVITY % W/W | 59.7 | 57.0 | 56.0 | 54.3 | 53.6 | 57.3 |
| BUTANE ACTIVITY % W/V | 18.2 | 17.8 | 17.8 | 17.4 | 17.1 | 17.8 |
| BUTANE RETENTIVITY, % W/W | 9.3 | 9.0 | 8.7 | 8.2 | 7.9 | 8.9 |
| BWC (RPD)(2), % W/V | 15.4 | 15.0 | 15.0 | 14.8 | 14.6 | 15.0 |
| VOLATILE CONTENT % W/W | 5.6 | 5.3 | 5.3 | 5.2 | 5.3 | 4.9 |
| TOTAL PORE VOL., ML/GM | 1.53 | 1.51 | 1.48 | 1.44 | 1.43 | 1.49 |
| BALL PAN HARDNESS, % | 78.8 | 91.0 | 89.3 | 89.7 | 91.1 | 90.2 |
| RAW BEAD DB AD, GM/ML | .773 | .771 | .769 | .776 | .766 | .754 |
| STAGE III TIME, MINUTES | 131 | 131 | 121 | 115 | 111 | 143 |

(1) THE RATE OF INCREASE OF THE FURNACE AIR SPACE TEMPERATURE IN °C PER HOUR, WHERE STAGE III BEGINS AT A FURNACE AIR SPACE TEMPERATURE OF 315°C.  
(2) RPD METHOD: 422 PURGE VOLUMES (ASTM METHOD D5228:718 PURGE VOLUMES)

FIG.5

APPARATUS FOR MAKING CHEMICALLY ACTIVATED CARBON

This is a division of application Ser. No. 07/891,734, filed Jun. 1, 1992, now U.S. Pat. No. 5,212,144.

FIELD OF INVENTION

The present invention relates generally to activation processes by which a sub-microscopic pore structure containing a large surface area and pore volume is created within a carbonaceous particle. More particularly, the invention relates to the chemical activation process, in which a carbonaceous raw material capable of chemical activation is impregnated with an activating agent such as phosphoric acid or zinc chloride for example, then heated to temperatures generally greater than 425 degrees C. to accomplish the simultaneous carbonization and activation of the cellulosic carbonaceous raw material.

BACKGROUND ART

The chemical activation process can be described essentially as a de-hydration reaction which removes almost quantitatively both the free water and the bound water content of a carbonaceous raw material. The term "bound water", as used herein, means the water of constitution, that is, the hydrogen and oxygen content of the molecules comprising the carbonaceous raw material and the activating agent. The term "free water", as used herein, means the water content present as water molecules in the initial mixture of the raw material and activating agent. The activating agent functions as a dehydrating agent to accomplish the removal of bound water from the carbonaceous raw material. The products of the activation reaction, therefore, are primarily carbon and water. One of the raw materials typically used in this very old and well known process is wood sawdust. However, other carbonaceous materials having a sufficient oxygen content greater than about 25 percent on a moisture and ash free basis can also be advantageously used and references to raw materials as used herein in the context of such materials mean those which are capable of chemical activation. Examples include but are not limited to cellulosic materials, peat and the low rank brown coals and the like. Those having the higher ranges of oxygen content as usually preferred.

As practiced heretofore, the conventional chemical activation process for practical commercial production consists of continuously feeding the impregnated raw material into one end of a direct-fired rotary furnace and discharging activated carbon at the other end. The term "direct-fired", as used herein, is defined as the introduction of combustion gases directly into the furnace to provide the heat energy necessary to accomplish activation. "Combustion gases" as used herein, mean the mixture of the products of combustion, most often natural gas or fuel oil, and secondary air. In this method, heat energy is primarily transferred from the combustion gases by their direct contact with the impregnated raw material to accomplish carbonization and activation. The combustion gases also function to convey, or sweep away, the water and acid produced by the activation reactions. The term "counter-current", as used herein, means that the flow of solid material and the flow of combustion gases occur in opposite parallel directions in the furnace. In this conventional direct-fired activation process, a quantity of fuel must be burned which provides sufficient heat energy to activate the raw material. This heat energy requirement is commonly referred to as the activation heat duty.

In the prior art commercial scale chemical activation processes, the temperature of the combustion gas is lowered from flame temperature by adding secondary or dilution air at a rate sufficient to produce the desired temperature of the furnace inlet gas in a counter-current manner relative to the introduction of the raw material feed. The temperature of the furnace inlet gas is maintained at a level which will raise the temperature of the carbon at the point of discharge from the furnace to a level which will produce the desired residual volatile, or un-carbonized, content of the furnace product.

While the activation level of activated carbon is often expressed on a weight basis, e.g., surface area or absorption capacity per gram of carbon, activated carbon is most often used on a volume basis. That is, a given fixed volume of activated carbon is employed to adsorb liquids or gaseous matter. Therefore it is desirable to be able to control the apparent density of the activated carbon end product so as to maximize its activity on a volume basis.

However, the nature of the conventional, commercially practiced, direct-fired process for making chemically activated carbon fixes certain process parameters in a manner which severely limits the ability to adequately control the treatment of the raw material and hence the ability to optimize the desired properties of the final end product.

Another very significant problem with the commercially practiced prior art processes for chemical activation of carbonaceous materials is that the raw material particles develop a "stickiness" or adhesiveness on their surface. Then the particles form agglomerates and/or adhere to the internal parts of the furnace. This problem is generally most pronounced during the early stages of activation. During this early critical period, the temperature of the raw material typically increases from about 90 degrees C. to about 160 degrees C.

Various methods are used to cope with this problem of adhesiveness, all of which create additional undesirable results. One method replaces flighting with scraper bars in the areas where sticking occurs. The removal of flights decreases the rate of heat transfer since the particles then reside in a bed instead of being lifted and showered through the combustion gases, thereby introducing an uncontrolled variation in the rate of the activation reaction. The method also has the undesirable result of degrading particles which become wedged between the scraper and the furnace wall.

Another method installs chains to either the flights or the furnace wall or both. While the movement of these chains does dislodge adhered particles, it also disintegrates many of these particles. Still another method recycles a portion of the furnace discharge product back into the furnace to absorb the excess accumulation of liquid from the surface of the sticky particles. This method has the disadvantage of reducing the production capacity of the furnace by an amount which is directly proportional to the rate at which carbon is re-cycled, and of producing unknown effects upon the activation properties of the re-cycled carbon.

This problem of excessive adhesiveness is discussed in Canadian Patent No. 842,778. This patent teaches recycling priorly activated carbon into the raw material feed to reduce sticking of the particles to one another or parts of the furnace.

U.S. Pat. No. 2,083,303 utilizes this excessive stickiness to form shaped particles which are then oven hardened and subsequently placed in a conventional rotary kiln to complete carbonization and activation. This process is not considered practically applicable to high volume, cost effective production.

Prior to the present invention, a satisfactory solution to the problems and control limitations associated with prior art chemical activation processes has eluded those skilled in the art. A method of chemically activating carbon which overcomes these problems in a practical and economical manner suitable for producing large commercial volumes of product has not been taught or suggested by the prior art.

SUMMARY OF THE INVENTION

The present invention relates generally to processes for making chemically activated carbons and particularly to a novel and improved process wherein control of the essential individual process variables is achieved in a practical and efficient manner.

Extensive test studies of the conventional process and analysis of the process variables has revealed that this very old process is quite complex. Tests attempting to more fully understand the effect of the process variables, such as inlet gas temperature and the mass and volume flow rate and composition of the combustion gases used were frustrated by the apparent interdependency and inter-relationship of these process parameters. It was discovered, for example, that the adhesiveness of the particles of raw material which most prevalently occurs during the early stages of the prior conventional processes, is caused by the accumulation of water which is evolved during this stage of the process on the surface of the particles. When this accumulation reaches a given point, the particles develop sufficient adhesive properties to stick to one another and to internal furnace parts and cause various problems associated with such agglomeration.

However, test run attempts to control the rate at which the activation reaction occurs, i.e., the rate at which water is evolved, determined that control of these rates requires relatively precise control of the rate at which heat energy is transferred to the raw material reactants. Further, tests determined that the rate at which these reaction products can be carried away from the raw material being treated is dependent upon the flow rate and composition of the gases passed through the furnace with respect to their ability to carry away the evolving water.

In the commercial, prior art processes referred to herein, the inlet temperature of the combustion gases is determined by the composition and rate of feed of raw material and the desired level of residual volatile content of the end product. This inlet temperature then fixes the mass and volume flow rate and the composition of the combustion gas-air mixture introduced into the furnace. These four variables are therefore inter-dependent. Further, since the mass flow rate of the combustion gas-air mixture and the temperature difference between this mixture and the raw material reactants determine the rate at which heat energy is transferred to the raw material, the rate of heat transfer to the reactants decreases at some undeterminable and therefore uncontrollable rate as the raw material passes through the furnace.

Further analysis and test studies have shown that the problem of attempting to control the activation reaction rate is further compounded by the fact that the volume flow rate and composition of the combustion gas-air mixture determines the rate at which the gaseous products evolved during the activation reaction are swept or carried away. After exhaustive analysis of the problems associated with the conventional direct-fired prior art process, it was concluded that this inter-dependency and inter-relationship between process variables makes it impossible to adequately control those variables in order to achieve or approach optimum activity expressed on a volume basis of the carbon product, and additionally minimize the occurrence and/or degree of stickiness and oxidation of the particles.

Therefore, the present invention relates to a novel solution of separating the heretofore inseparable and interdependent process variables of combustion gas inlet temperature, mass and volume flow rate and composition into independently controllable variables. In accordance with the present invention, heat energy is supplied indirectly to the particles of raw material through the wall of the furnace independent of the flow of sweep gases in the furnace, thus making it possible to independently control the rate at which heat energy is transferred into the material. The combustion gases of the conventional process are replaced by a sweep gas whose composition and flow rate are independently controlled relative to the heat source so as to more effectively volatilize and carry away the water and acid products of the activation reaction as they are evolved, thereby preventing excessive adhesiveness of the particles from developing and at the same time permitting independent control of the transfer of heat energy in a manner selected to control the level of densification of the particles of raw material.

The sweep gas is introduced into and removed from the process furnace together with its content of evolved water and acid at spaced intervals along the length of the furnace in order to minimize the adverse effects of evolved water and acid upon the composition and relative humidity of the continuous inlet flow of sweep gas. This maximizes its ability to efficiently carry away the evolved volatiles. When separated, in accordance with the teachings of the present invention, these process variables can be independently controlled so as to more precisely control densification, while minimizing agglomeration and oxidation of the particles to dramatically enhance the ability to improve selected properties of the activated carbon end product.

Therefore it is an object of the present invention to provide a novel process to make chemically activated carbon wherein the process parameters can be more effectively controlled to produce the desired properties of the end product in a highly reliable manner.

Another aspect of the present invention relates to the heat energy being supplied to the raw material by indirect heating means through the walls of the activation furnace while an independent source of a sweep gas is employed to carry away the volatile reaction products evolved during processing. This separation of means for accomplishing heat transfer and carrying away of the reaction products of the process permits the control of process variables in an economical and commercially practical manner to maximize the desirable properties of the end product and minimize the problems long associated with the prior art direct-fired process.

It is another aspect of the present invention to provide a novel chemical activation process which, preferably, is essentially divided into three stages and wherein the rate at which heat is transferred to the raw material and the volume flow rate and composition of the sweep gases may be varied in order to maximize control of the desired properties of the end product and obtain an activated carbon product which exhibits superior properties compared to the products produced by prior art processes.

BRIEF DESCRIPTION OF DRAWINGS

FIGS. 1-4 are tables containing data related to the first, second and third stage treatment of a mixture of carbonaceous raw material and a chemical activating agent in accordance with the process of the present invention.

DETAILED DESCRIPTION

In accordance with the present invention, it has been discovered that chemical activation occurs in three distinct stages. These stages can be distinguished from each other by the extent to which densification of the particles occurs; and by the corresponding rate of the activation reactions as measured by the rate at which water is evolved.

For this purpose, densification or shrinkage of the particles is expressed as the percentage increase in the dry basis apparent density of the particles from the beginning to the end of each stage. The rate of the activation reactions can be measured as the weight of water evolved per minute and may be expressed as a percent of either the total free or bound water to be removed. These rates can be controlled by the rate at which heat energy is transferred to the particles of raw material.

The stages can also be differentiated by the different causes of stickiness or excessive adhesiveness and/or by the point during the activation process when the propensity of the particles to stick begins or ends.

In accordance with the more preferred embodiment of the present invention, it has been discovered that control of the reaction rates by closely controlling and selecting the rates of heat transfer to the raw material during these different stages permits one to selectively determine and enhance chosen desirable properties in the end product.

In the first of these stages, preferably an amount of water is removed which approaches or is approximately equal to the free water content of the impregnated carbonaceous raw material entering the furnace. In accordance with the present invention, the majority of the total densification or shrinkage which can be accomplished during the entire activation can be made to occur during this initial stage. The rate at which water is evolved is much higher in this stage than in subsequent stages. During this initial stage, free water migrates from the interior of the particle to its exterior surface where it accumulates. This accumulation, if not minimized, causes the particles to become very sticky and results in the particles adhering to each other and/or to the walls or other internal surfaces of the furnace in the form of agglomerates of the individual particles.

The transfer of heat energy into the process materials can be controlled at rates which will cause a selected level of densification of the particles to occur. The flow rate of the sweep gas is controlled in a variable manner related to the rate of evolution of free water at a rate sufficient to evaporate and carry it away to minimize its accumulation on the exterior surface of the particles. This ability to independently control the sweep gas volume flow rate makes it possible to prevent the occurrence of excessive adhesiveness which causes particles to adhere to one another or to the internal parts of the furnace.

Further, the sweep gas is preferably introduced at controlled volume flow rates at multiple points spaced along the length of at least the first furnace stage and removed in a like manner so as not to significantly affect the incoming sweep gas composition in this stage. In the most preferred embodiment, the sweep gas is introduced and removed in this same manner in the subsequent treatment stages.

After the first stage is complete, the raw material is preferably introduced into a second furnace stage, which preferably is separated by air locks or their equivalent from the first furnace stage and the third furnace stage which is employed in the most preferred embodiment.

The sweep gases may be conveniently introduced in the described controlled manner via a sparger tube extending along the length of the furnace structure and provided with spaced outlet ports or nozzles directed toward the moving bed of the process materials. An opposing tube having spaced inlets and operably connected to a source of negative pressure functions usefully to exhaust the sweep gas and its content of evolved reaction products. The size or number of outlet and inlet ports is varied to conveniently control the volume of flow contacting various portions of the bed of particles being treated.

In the second stage, bound water is removed to the extent of approximately at least 40 percent and preferably about 50 percent of its original content. The amount of densification which can be accomplished in this second stage is typically less than in the first stage, for example, about 18 percent of the densification which can be made to occur in the first stage. The rate of the activation reaction is controlled in a preferred example of the present invention so that the bound water is evolved at an average rate of about 0.67 percent of the total bound water content per minute, assuming that substantially all of the free water was removed during the first stage. During this second stage, water is typically evolved at a much lower average rate than in the first stage and the rate of evolution decreases with increasing temperature. Consequently, the propensity of the particles to become sticky is significantly less than in the first stage.

As in the first stage, heat energy is transferred into the raw material at a desired rate normally selected to cause a chosen degree of densification of the particles to occur. The flow rate of the sweep gas may be maintained at a constant rate sufficient to evaporate the evolved water at a rate which will preclude the development of adhesiveness of the particles. As in the first stage, the sweep gas is preferably introduced at multiple points spaced along the length of the second stage furnace and removed in a like manner so as not to significantly affect the composition of the incoming sweep gas. That is, so as not to increase the relative humidity of the incoming sweep gas and materially lessen its ability to remove the water being evolved.

In a preferred embodiment of the present invention, the third stage treatment is chosen to begin when the temperature of the particles of raw material reaches or approaches approximately 315 degrees C. This represents the temperature at which the activating agent used, phosphoric acid, begins to volatize and give up its bound water. At this point the partially treated material is preferably delivered to a third furnace stage. In this last stage, a selected amount of the remaining bound water is removed which will reduce the residual volatile content in the activated carbon product to a chosen value, for example preferably between about 4 to 10 percent.

In one preferred example described herein, the amount of densification which is accomplished in this third stage approaches about one third of that which occurred in the second stage. Bound water is evolved at an average rate during this third stage treatment of approximately 0.27 percent of the initial total of bound water content per minute. During this last stage, phosphoric and polyphosphoric acids, as well as water, migrate from the interior of the particle to its exterior surface where they accumulate. The rate of migration of these acids and hence their rate of accumulation increases with increasing acid content of the raw material. As in the case of water accumulation in the first stage, an excessive accumulation of acids, if not minimized, causes the particles to become very sticky and results in their adherence to each other and to the walls of the furnace. Therefore, the volume rate of flow of the sweep gas is preferably adjusted to assure that excessive accumulation of these volatiles does not occur. Further, it has been found that the composition of the sweep gas in this third stage should preferably consist of a mixture of gases having an oxygen content below that which will permit any appreciable oxidation of the carbon product at the chosen flow rate. A mixture of air and combustion gases are preferred for this purpose for practical purposes and tend to effectively reduce the accumulation of acid which can cause excessive adhesiveness of the particles. Excessive stickiness most likely can occur in this third stage when the weight ratio of acid to cellulose in the raw starting material is relatively high compared to those ratios commonly used in the prior art conventional process. However, in the most preferred embodiment, the sweep gas mixture referred to above in this third stage is not employed to deliver heat energy to the process materials being treated, but is only employed as a sweep gas to carry away the evolving volatile content.

In the more preferred embodiment of the present invention, the heat energy continues to be transferred into the process materials indirectly as in the prior stages during the third stage at a rate controlled to cause a selected degree of densification of the particles to occur. Particle stickiness is minimized by introducing a predetermined volume flow rate of the sweep gas mixture. Preferably the sweep gas composition consists of the products of combustion of natural gas or fuel oil diluted with air. The flow rate of the sweep gas is selected to be sufficient to evaporate and carry away the acids and water evolved and thereby minimize their accumulation on the surface of the particles being treated and is preferably introduced and removed in a similar manner as in the preceding stages.

In this latter stage of the preferred treatment, the percentage of volatile content removed is lower than in the preceding stages, however, the activity level of the carbon particles is being increased by a much greater amount compared to the preceding stages.

It should be noted that one may choose to employ the first stage treatment described and thereafter in a continuous process use conventional direct-fired methods to complete activation and carbonization within the spirit of the present invention to obtain the benefit of certain of the advantages described herein which are gained in the first stage treatment. Similarly, one may choose to use a combination of the first and second stage treatment with subsequent conventional processing to improve the properties of the resulting end product compared to the prior art in accordance with the teaching of the present invention. However, in the more preferred embodiment of the present invention, it is more desirable to continue the high degree of control of the transfer of heat energy by indirect heating and close control of the composition and volume flow rate of the sweep gas as described herein during the third treatment stage to provide a higher level of control and selectivity of the desired properties produced in the end product for a particular application.

For example, in many applications it is desirable to maximize the activated carbon end product's activity as expressed on a volume basis. On the basis of tests to date, there is evidence that this desirable property for certain applications more often occurs at a level of densification less than the maximum densification which is achievable using the process of the present invention. Further, higher acid/wood ratios may be employed to alter activity levels while preventing excessive stickiness from developing in this latter stage of treatment because the flow rate of sweep gas may be adjusted to control the accumulation of evolved acid on the surface of the particles.

However in most applications it is desirable to control the process variables to maximize the densification of the particles which occurs during the preferred first treatment stage as described herein.

In Example I described herein, the end product exhibited a butane working capacity (BWC) of over 16.0 compared to the conventional products which have a BWC in the range of 8 to 12. The butane working capacity is recognized by the industry as a useful measure of the ability of the activated carbon end product to usefully adsorb and desorb many organic compounds.

The degree of control of the process variables in accordance with the present invention permits fine tuning of the activation process in an organized manner not achievable in the conventional direct-fired process as presently commercially practiced. Further it permits far greater control and optimization of the properties of the end product deemed most desirable for a given application in an economically practical manner as compared to the limitations inherent in the prior art direct-fired processes.

The following Example I illustrates one preferred embodiment of the process of the present invention.

EXAMPLE I

A composition consisting of 100 parts by weight, dry basis, of carbonaceous raw material, 25.9 parts by weight, dry basis, of carbonaceous raw material binder, 157.2 parts by weight of 100 percent phosphoric acid and 51.4 parts by weight of free water was activated according to the teachings of the present invention. The raw material consisted of wood flour mixed with the phosphoric acid and an ammonium lignosulfonate binder. This mixture was extruded into shaped pellets. The dry basis apparent density of the pelletized mixture was 0.754 grams per milliliter. A measured weight of the pellets was treated in three stages in an indirect fired rotary furnace or kiln having means to supply an independently controlled flow rate of sweep gas into the furnace.

In the first stage, heat energy was transferred into the particles at a rate which increased their temperature from 20 degrees C. to about 154 degrees C. in 90 minutes. After approximately 45 minutes of heating, water began to evolve at the rate of approximately 0.5 percent of the initial total free water content of the pellets per minute. After approximately 90 minutes, the rate of evolution of water had reached a maximum of approximately 3.4 percent of the initial free water content per minute, and substantially all of the initial free water content had evolved.

The particles were prevented from becoming sticky by contacting them with an air sweep gas at an initial rate of 2.7 liters/min equivalent to 0.96 liters of air per gram of raw material feed rate, and by graduated increases of this rate to 25.4 liters/min equivalent to 9.1 liters per gram of raw material rate feed by the end of the stage.

During this first stage, the dry basis apparent density of the feed particles increased from 0.754 to 1.00 gram per milliliter, which amounts to a densification of 32.6 percent.

In the second stage, heat energy was transferred into the particles at a rate which increased their temperature from about 154 degrees C. to about 311 degrees C. in 73 minutes. Bound water was evolved at an average rate of 0.67 percent of the original total bound water content of the pelleted feed per minute. At the end of the stage, 49 percent of the total bound water content had been evolved.

The particles were prevented from becoming sticky by contacting them with an air sweep gas at a constant flow rate of 7.5 liters/min equivalent to 2.68 liters of air per gram of the raw material feed rate to the first stage.

During the second stage, the dry basis apparent density of the feed particles increased from 1.00 to 1.06 grams per milliliter, which amounts to a densification of 6.0 percent.

In the third and final stage, heat energy was transferred into the bed of feed particles at a rate which increased their temperature from about 311 degrees C. to about 512 degrees C. in 142 minutes.

Bound water was evolved at an average rate of 0.27 percent of the original total bound water content per minute. At the end of the stage, 93 percent of the total bound water has been evolved.

The feed particles were prevented from becoming sticky in this third stage by contacting them with a sweep gas consisting of a mixture of the products of combustion of natural gas and air containing 8.9 and 10.9 volume percent of oxygen and steam respectively at a constant flow rate of 10.0 liters/min equivalent to 3.57 liters per gram of the raw material feed rate to the first stage.

During the last stage, the dry basis apparent density of the feed particles increased from 1.06 to 1.08 grams per milliliter, which amounts to a densification of 1.9 percent.

After the acid was extracted, the activated carbon produced as described above had the following properties:

| | |
|---|---|
| Apparent density, dry basis, grams per milliliter | 0.359 |
| Carbon tetrachloride activity, % weight by weight | 149 |
| Carbon tetrachloride activity, % weight by volume | 53.5 |
| Butane activity, % weight/weight | 56.1 |
| Butane working capacity | 16.2 |
| Volatile content, % weight by weight | 7.0 |

The carbon tetrachloride activity on a weight basis was determined using the ASTM standard test method D3467-88. The butane activity on a weight basis and the butane working capacity was determined using the ASTM standard test method D5228-91. The method for determining the volatile content other than moisture was determined using a procedure wherein the sample is heated in a nitrogen atmosphere to expel its volatile content at a temperature of 650 degrees C. The sample was weighed before and after heating and the volatile content was calculated on the dry basis weight of the sample.

Details of the composition of the raw material and the calculations of the rates of evolved water for the process described in Example I is based upon the formulation described below having a free water content of 15.4 percent and a bound water content of 39.7 percent on a dry weight basis:

| Composition: | Weight, gms | Parts By Weight |
|---|---|---|
| Woodflour, db | 255 | 100.0 |
| Lignosulfonate binder | 66 | 25.9 |
| Phosphoric acid, 100% | 401 | 157.2 |
| Free water | 131 | 51.4 |
| TOTALS | 853 | |

WEIGHT OF WATER EVOLVED AT INTERVALS OF TIME BASED UPON A BATCH CONSISTING OF 853 GRAMS OF RAW MATERIALS FED INTO FURNACE

Stage I Initial Rate
10 gms at 60 min
0 gms at 45 min
10 gms in 15 min = 0.67 gms/min ÷ 131 × 100 = 0.51% of total free water per min Stage I Final Rate
131 gms at 90 min
65 gms at 75 min
66 gms in 15 min = 4.4 gms/min ÷ 131 × 100 = 3.4% of total free water per min Stage II Average
271 gms at 163 min
131 gms at 90 min
140 gms in 73 min = 1.92 gms/min ÷ 287 × 100 = 0.67% of total bound water per min Stage III Average
380 gms at 305 min
271 gms at 163 min
109 gms in 142 min = 0.768 gms/min ÷ 287 × 100 = 0.27% of total bound water per min As earlier noted, in the above example the starting material consisted of finely divided woodflour, phosphoric acid and a carbonaceous binder which was mixed together and extruded into discrete pellets to form a shaped particle. A generally similar mixture of cellulosic raw materials is described in U.S. Pat. No. 3,864,277.

The shaped particles were treated in a rotary furnace under conditions simulating a continuous feed of raw material in three distinct stages as described earlier herein. The heating rate as measured in the air space adjacent to the furnace wall was approximately 70 degrees C./hr during the first stage. This initial stage was terminated when a measured amount of water, greater than at least about 90 percent of the initial free water content, had evolved and the temperature of the bed of raw materials was approximately 154 degrees C. In a second stage treatment, the heating rate measured in the same fashion as above was approximately a constant 100 degrees C./hr. This second stage was ended when the measured amount of evolved water was equal to approximately 49 percent of the initial bound water content and the bed of treated particles reached approximately 311 degrees C.

In the third stage, the heating rates as measured in the air space adjacent to the wall of the furnace were increased at the rate of approximately 30, 60, 90 and 120 degrees C./hr at selected time intervals to raise the temperature of the bed to a final temperature of approximately 512 degrees C.

The acid content of the activated carbon end product was extracted to reduce the extractable acid content to approximately one percent by weight on a dry carbon basis and the properties referred to earlier herein were determined using test procedures described above.

Heat was applied to the walls of the rotary furnace by electrical heating elements controlled by a commercially available, conventional programmable controller to deliver the selected rate of heat energy transferred through the walls of the furnace to the particles of raw material. Appropriate commercially available test equipment was employed to measure the water evolved and control the composition, flow rate and the inlet temperature of the sweep gas. The temperature of the sweep gas introduced was selected to be about the average temperature of the particles of raw material from the beginning to the end of each treatment stage. This value was chosen to minimize any heating or cooling effect of the sweep gas upon the particles of raw material in the furnace so that the treated material received the necessary heat values essentially as transferred through the walls of the furnace to maintain precise control of heat transferred to the particles.

One desirable object of forming a reconstituted pellet as described above is to obtain a shaped chemically activated carbon end product of predetermined size. The agglomeration of such pellets, as typically occurs in the prior direct fired activation process, is a particularly disabling factor. However, employing the process according to the present invention, such agglomeration can be readily avoided to produce chemically activated pellets which retain their original shape. Under appropriate control of the essential process variables described herein, the pellets maintained their initial shape to a very satisfactory degree at the end of the process. Production of such a product on a commercial scale using prior art process methods was found to be impractical despite the very significant advantages of such a chemically activated pelleted product due to sticking and agglomeration which materially reduced the percentage of end product having the desired size and shape. Further, agglomeration of the particles of raw material during processing makes it impossible to uniformly treat the material to provide uniform activation properties.

In this connection it is believed that the high degree of control of densification of the particles during treatment in accordance with the present invention, permits one to dramatically enhance the activity level on a volume basis for a given starting raw material capable of chemical activation. This is true whether the starting raw material is a reconstituted shaped particle or a natural granular particle, such as wood sawdust. The basic principle involved relative to the activation reaction remains the same with respect to closely controlling heat transfer to the particles during processing and avoiding excessive adhesiveness of the particles during such processing.

Further, employing the most preferred embodiment described herein, it should be noted that the end or final temperature of the treated material which affects the volatile content of the end product can be selected independently of the selected rates of heat transfer applied in the earlier stages. Further, the heat transfer rates applied in the first, second and third stage of treatment may be adjusted over a wide range independent of the other stages and the selected end processing temperature of the treated material. This cannot be accomplished in a practical manner in the prior art, direct fired commercial chemical activation processes. Therefore, the raw material may be processed on a commercially practical scale in a manner to control the densification and activation properties of the treated particles in a highly selected manner not practically feasible using conventional direct fired processes.

Figure 1:
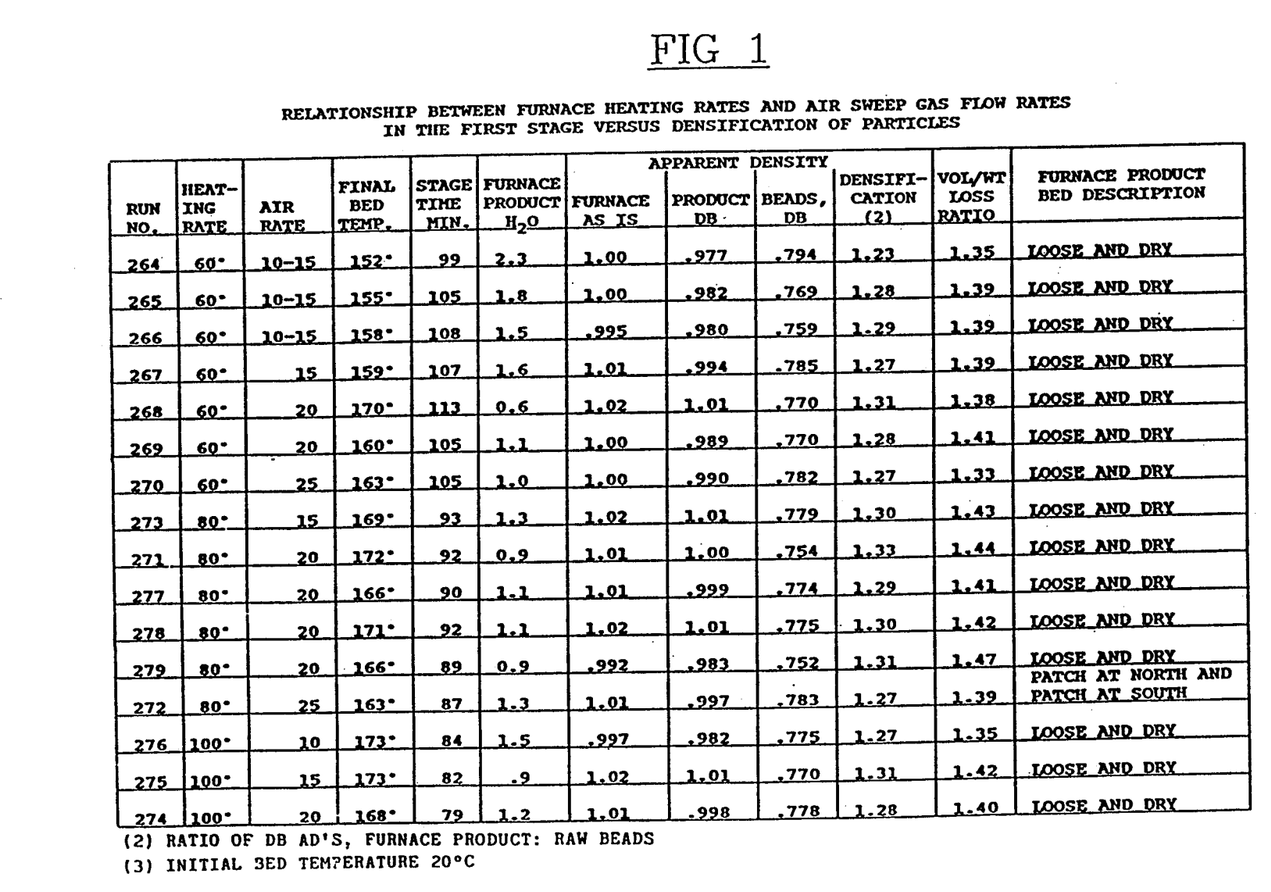

With reference to FIG. 1, a table illustrates data from several test runs of a given raw material composition of an initial treatment stage in accordance with the present invention in which the target end point was removal of at least approximately 4 percent of the bound water content to assure an amount of water was removed at least equal to the total free water content of the starting raw material mixture. The raw material consisted of a pelleted carbonaceous mixture of a similar type as described in Example I. The test conditions involved varying the heating and air sweep gas rates to determine their relative effect on the degree of densification achieved and the condition of the bed of particles during the treatment stage. The end point bed temperature was varied between about 152 to 173 degrees C.

The pelleted raw material feed was placed in a laboratory rotary furnace of the type described in Example I and constructed in accordance with the present invention. The heating rates were set at 60, 80 and 100 degrees C. per hour while the air sweep gas rates were varied as indicated in FIG. I.

Figure 3:
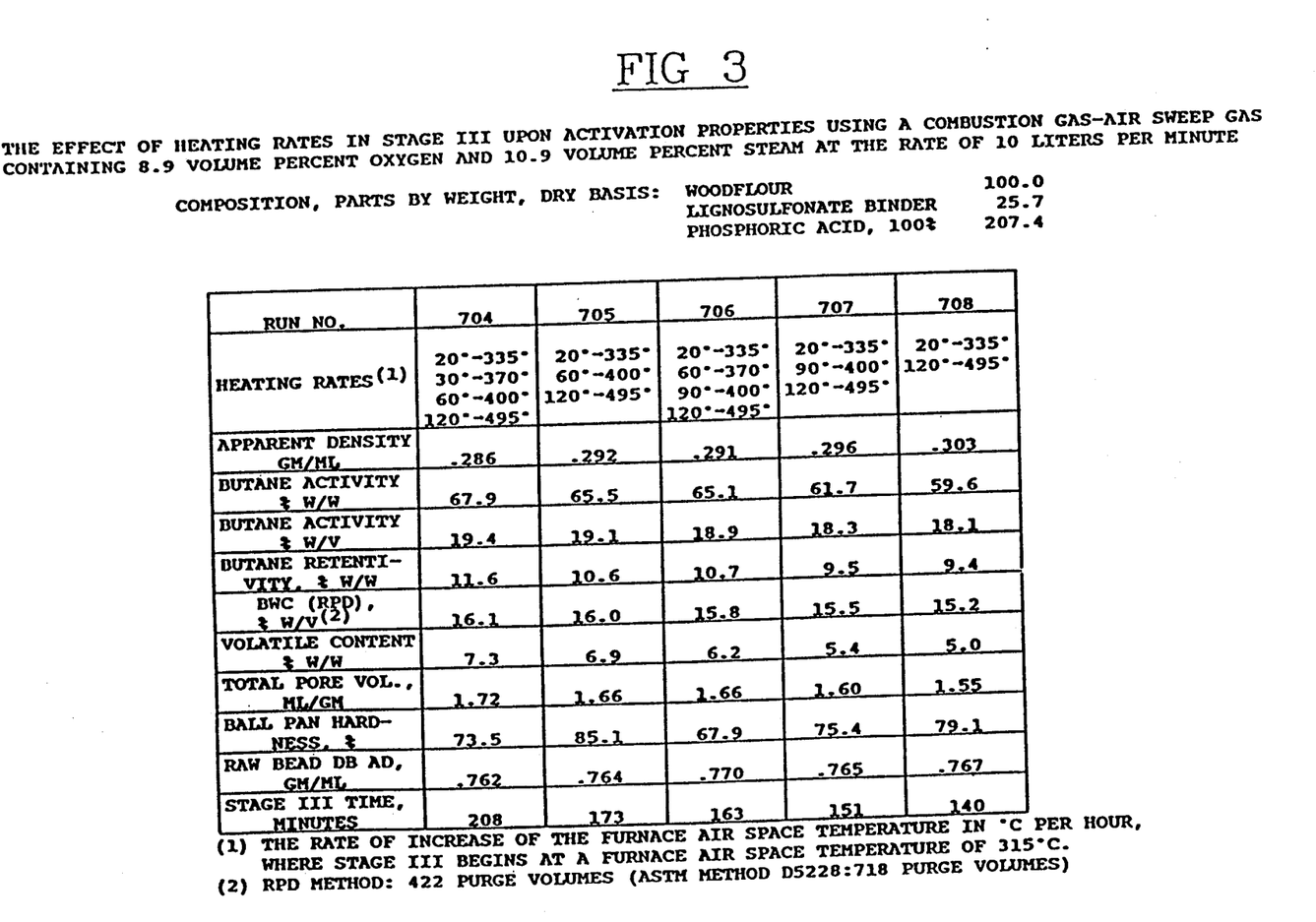

The heating rates in FIGS. 1-3 were measured in the air space between the heat source and the furnace wall and were used to control the heating profile used in these test runs.

The densification ratios obtained varied between 1.23 to 1.33 as determined by the ratio of the dry basis apparent densities of the product at the end of the treatment over the raw material pellets or beads introduced into the furnace. It was noted that the treated material stayed loose, dry and free flowing at air sweep rates varying from 10 to 25 liters per minute. Runs 264 through 266 used a variable air sweep gas flow rate beginning at 10 and increasing to 15 liters per minute at the end of the treatment stage.

These test runs indicate that a constant heating ramp in the initial stage treatment as described earlier herein between 60 to 100 degrees C. per hour with an air sweep gas rate of about 10 liters per minute or greater function well to achieve a desirable range in the degree of densification occurring during the first treatment stage while preventing agglomeration of the particles of raw material. Although it should be noted that other tests such as Example I herein show that the air sweep gas rate can be varied between 2.7 liter/minute at the beginning of the treatment and increased in steps up to 25 liters per minute near the end of the stage and produced very good results with an average heating rate of 70 degrees C. per minute.

Another set of test runs are shown in FIG. 2 wherein a table shows data obtained to determine the effects of different heating and air sweep gas rates using a given starting raw material composition during the second treatment stage according to a preferred embodiment of the present invention. For each of the test runs noted in FIG. 2, a carbonaceous raw material was prepared in a similar manner as described in Example I and was treated during an initial stage treatment at a heating rate of 70 degrees C. per hour to an end point bed temperature of about 150 degrees C. wherein at least about 4 percent of bound water was removed. An air sweep gas was introduced during the initial treatment stage as earlier described herein in Example I at a variable rate beginning at 2.7 and increasing to 25.4 liters per minute at the end of the first treatment stage.

The composition of the starting raw material, and furnace conditions are noted in FIG. 2 as well as the furnace conditions for the first treatment stage and third treatment stage where applicable. An essentially identical laboratory rotary furnace design as previously described was employed for all stages of treatment. In runs 869 through 873 the furnace product was removed at the end of the second stage treatment and the properties of the furnace product were determined and are listed in FIG. 2. In runs 874 through 877, 883 and 732, the furnace product of the second stage treatment was subsequently treated in a final or third treatment stage to produce an activated carbon product. The apparent density, butane activity, BWC, volatile content, ball pan hardness and total pore volume of the carbon end product were determined and are shown in FIG. 2. The third treatment stage conditions employed variable heating rates similar to the heating rates noted in test run 714 listed in FIG. 3 which is described later herein. Also a sweep gas composition similar to that used in Example I was employed in the third treatment stage at a rate of 10 liters per minute. Based upon the present studies, it is believed that heating rates used between about 70 to 100 degrees C. per hour, which correspond to rates of increase in the temperature of the bed of particles of about 90 to 160 degrees C. per hour are generally preferred over higher rates in the second treatment stage. It should be noted that a lower volatile content in the furnace product after the second stage treatment, resulted in higher activation properties measured at the end of that stage. However if the second stage treatment in runs 871 and 872 was continued until the bed temperature was 315 degrees C., it is believed that the volatile content of the runs would have been closer and the activation properties would have also tended to be corresponding closer. The data from those runs where the second stage product was treated in a third stage, as noted in FIG. 2, tends to show that increasing the heating rates as measured at the bed of particles above about 130 degrees C. per hour in the second treatment stage tends to decrease the activity of the final carbon end product on a weight and volume basis, the BWC and the total pore volume as seen in the results noted in runs 883, 876 and 877.

This study also indicates that an increase in the bed temperature of about 130 degrees C. per hour and a sweep gas flow rate of about 7.5 liters per minute provides results not significantly different than the lower rate of 95 degrees C./hr during the second treatment stage and significantly shortens the processing time of the second stage. However, it should be also noted that the other results obtained represent a very good end product wherein BWC values of greater than 15 are obtained. It should also be noted that under the recently adopted ASTM method of determining BWC, as used in Example I, the results noted in FIG. 2 and FIG. 3 would be approximately 0.3 to 0.7 units higher than the values determined using a similar method but employing 422 purge volumes instead of 718.

Now referring to FIG. 3, another table illustrates the effects of variably increasing the heating rate and the overall time of treatment in a third stage treatment according to the present invention to complete carbonization and activation of the particles of the feed material. As in the previously described test runs, the heating rates shown in FIGS. 1-3 represent the rate of increase of the temperature measured in the air space between the heating element and furnace wall in degrees C. per hour. In the test runs noted in FIG. 3, the feed was formulated into a pelleted carbonaceous raw material having a composition as noted in FIG. 3 and was treated essentially identically through a first and second treatment stage in a furnace identical to that described in the prior examples.

The furnace conditions employed in the runs shown in FIG. 3 used a heating ramp of 70 degrees C. per hour in first treatment stage and 100 degrees C. per hour in the second treatment stage with the target end point of the second stage treatment being a bed temperature of approximately 310 degrees C.

The test results of the runs referred to in FIG. 3 indicate that the initial heating rate applied during the third treatment stage over the measured bed temperature range of approximately 290 to 360 degrees C. which corresponded to the measured furnace air space temperatures of approximately 315 to 335 degrees C., has a very significant effect on the activation properties of the end product.

Further, the heating rates applied to the particles beyond this initial range of bed temperature in this third stage also affect the activation properties of the end product to a significant but lesser extent than in the initial period of treatment in this stage.

As noted earlier, the heating rates for each heating ramp or step noted in FIG. 3 was determined by the temperature measured in the air space between the heat source and furnace wall which was lower than the temperatures essentially simultaneously measured at the furnace wall and in the bed of particles in the rotary furnace used in these runs.

For example, the initial heating rates of 20, 30, 40, 50 and 60 degrees C. per hour as measured in this air space represented an average rate of temperature increase of the bed of particles of approximately 41, 55, 74, 85 and 97 degrees C. per hour respectively.

In test run 704, the temperature profile using the air space heating ramps of 20, 30, 60 and 120 degrees C. took 208 minutes total processing time at the stated sweep gas flow rates to reach the final bed temperature of 509 degrees C. The end product produced exhibited the lowest apparent density value, and the highest values of butane activity on a weight and volume basis, BWC and total pore volume. Generally the test runs noted in FIG. 3 shows that increasing the initial heating rate in the third treatment stage between, for example, bed temperatures of about 300 to about 350, as well as beyond that temperature range, tends to decrease the above activity levels while producing higher values in apparent density, ball pan hardness and a lower volatile content in the end product.

The data in FIGS. 2 and 3 particularly provide one illustration of how to vary the activation properties of the carbon end product by selecting and controlling the heating rates applied to the process materials to affect the rate of the activation reaction during the second and third stage treatment. It also illustrates that these variations can be accomplished using the same starting raw material composition without changing the intrinsic physical design of the activation furnace and show that a relatively wide range of activation property values are producible in the end product merely by controlling these heating rates without significant alteration of other process variables.

It should also be noted however, that all of the test runs listed in FIGS. 2 and 3 provide a very good end product compared to products produced in conventional, commercial scale processes and that the treatment afforded the raw starting material in the earlier treatment stages provided the basis for achieving the excellent results as noted in FIG. 3 during the third treatment stage using a variety of heating profiles.

The most desirable rates of heat transfer can be determined for a given application and raw starting material composition without undue experimentation employing the teachings of the present invention. The high degree of control of the rate of heat transfer throughout the process enables one to relatively quickly arrive at the most desirable rates relative to obtaining the desired effect. Once the described heating rates are established, the desired properties of the end product can be achieved with greater reliability and uniformity compared to products produced by prior art processes.

In particular, the rates of heat transfer which are determined to provide the particular desired densification of the particles and other activation properties are not limited by the problem of excessive stickiness of the particles because the volume flow rate of the sweep gas can be independently adjusted to eliminate any such problem.

However, it should also be noted that the volume flow rate of the sweep gas also affects the rate of the activation reaction. Generally, higher flow rates tend to increase the rate of evolution of water and can affect the rate of densification and other activation properties. When a pelleted or formed feed material is being treated, it is generally preferred to use a flow rate of sweep gas sufficient to prevent undesired sticking and agglomeration without otherwise unnecessarily increasing the sweep gas flow rate.

Figure 4:
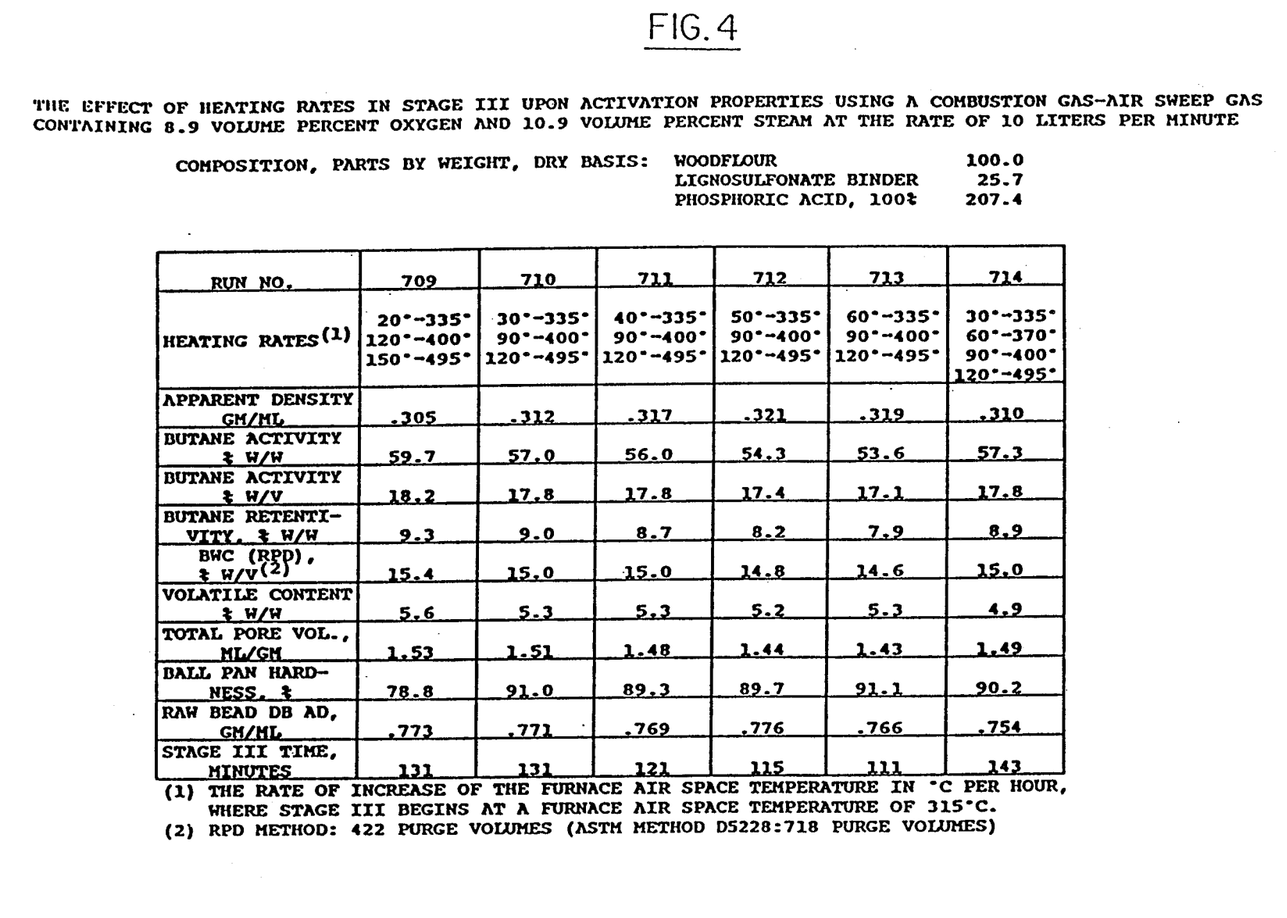
Figure 5:
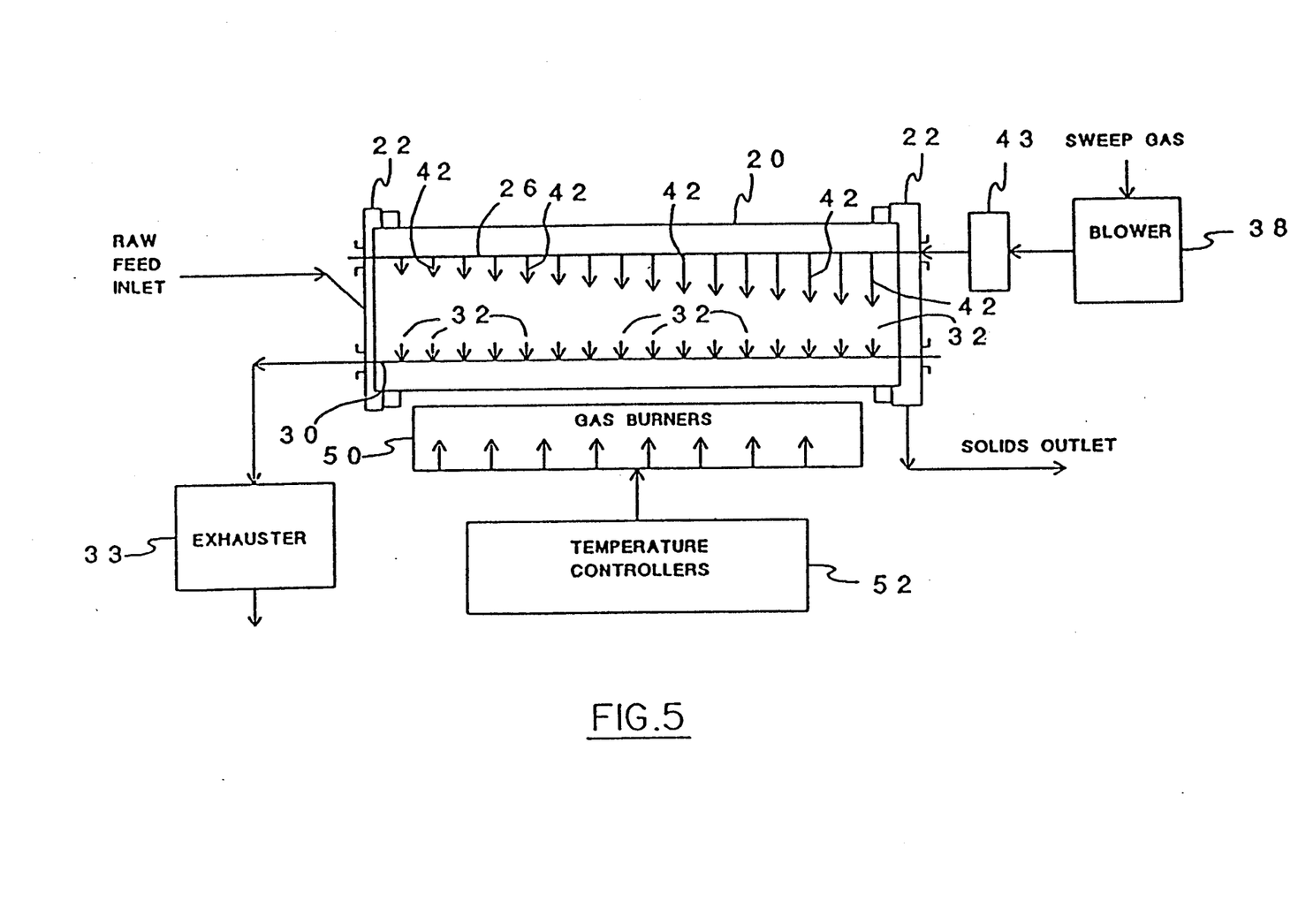
FIG. 5 is a diagrammatic view of a furnace apparatus and associated equipment constructed in accordance with the present invention illustrating treating raw material in accordance with the process of the present invention.

Now referring to FIG. 4, a schematic diagram of a preferred design for a commercial scale rotary furnace for practicing the present invention is illustrated. Preferably, at least two or three indirect-fired rotary furnaces would be employed. The first and second stages could be conveniently treated in one furnace structure because both use an air sweep gas. Indirect fired furnaces in general are well-known and an otherwise conventional indirect-fired rotary furnace is modified in accordance with the present invention by providing a rotary furnace, such as indicated diagrammatically at 20, with an inlet sparger tube, such as 26. The sparger tube is mounted through stationary housings or hoods 22 located at each end of the furnace, to permit furnace 20 to rotate about the stationary sparger tube 26. The openings at the juncture of the ends of the furnace and the stationary housings or hoods 22 are provided with conventional seals to isolate the inside of the furnace from the ambient atmosphere.

An exhaust tube, such as 30, is similarly mounted through the stationary hoods and is disposed in parallel spaced relationship relative to the inlet sparger tube 26.

The inlet end of the sparger tube 26 is conventionally connected to a source of sweep gas which may be provided by a conventional blower, such as 38. The blower 38 provides a controlled, predetermined volume flow rate of sweep gas to the furnace 20 through sparger tube 26. It is preferred that a separate furnace of essentially the identical design of furnace 20 be used for at least the third stage treatment and be connected to a separate blower operatively connected to a source of a combustion gas-air mixture to provide the preferred sweep gas composition for the third treatment stage in accordance with the present invention. One may also choose to use a separate but essentially identical furnace design as furnace 20 and separate associated components for the second stage treatment merely for practical reasons of space or equipment design in view of the extra length necessary for a furnace which would handle the capacity of both the first and second stage treatment conditions.

In either the two or three furnace arrangement, a conventional air lock would be employed in a well-known manner between the outlet and inlet of the furnaces to isolate the internal atmosphere of each furnace.

The sparger tube 26 is provided with a plurality of outlet ports or orifices, such as 42, spaced along the length of tube 26. The number of orifices per unit length or the size of the orifices may be varied to conveniently control the volume flow rate of sweep gas from each orifice which is introduced into contact with the raw material being treated which passes along the length of furnace 20 in the proximity of the orifices 42.

The sparger tube 26 in kiln 20 for the first stage treatment, in a preferred embodiment of the present invention, is constructed to introduce an increasing volume flow rate of air sweep gas into contact with the raw materials as the raw material travels from the inlet of furnace 20 toward the kiln outlet. As earlier described herein, the rate at which water is evolved from the raw materials typically increases in the first treatment stage as the temperature of the particles increases and the materials approach the furnace outlet. This variable flow rate of sweep gas is diagrammatically illustrated by the increasing length of the arrows representing the volume flow rate from orifices 42. In the second and third treatment stages, a constant flow rate of sweep gas from each orifice may be used and provides good results.

In conventional fashion, furnace 20, is surrounded by an insulating jacket, not shown, and includes an array of independently controlled gas fired burners, illustrated at 50, which are provided to generate the heat energy transferred through an air space between the insulating jacket and the outer walls of furnace 20. While other conventional means may be used as an indirect heat source, such as electric coils, gas fired burners would normally be considered as the most economically practical source of heat energy in a commercial scale process.

There are many commercially available, conventional temperature controllers of varying degrees of accuracy available to control the degree of heat energy supplied by the indirect heat source and operate in a manner well-known to those skilled in the art of industrial furnaces.

For purposes of the present invention, the degree of accuracy of the temperature controller chosen should be capable of maintaining the desired temperature profile of the bed of materials traveling through the furnace to obtain useful results in accordance with the teachings of the present invention. Within economically practical limits, reasonably precise control of the heating source provides a greater range of selectivity to affect the properties of the end product in a more reliable manner.

The temperature controllers, indicated at 52, are operatively connected to the gas burner array 50 associated with furnace 20, and includes suitably positioned temperature sensing devices associated with the walls of furnace 20 to feed back temperature data to the controller circuitry. The controllers can be set to vary the heat energy generated by the gas burners through the walls of the rotary furnace and hence to the bed of raw materials to provide a predetermined increasing temperature profile or heating ramp of the bed of raw materials as they advance through a furnace 20.

As described earlier herein, the independent control of the rate of heat transfer to the bed of raw material provides means to more precisely control the rate of evolution of the volatiles from the material being processed in each of the three treatment stages. In accordance with the teachings of the present invention, the rate of the evolution of the volatile content of the feed material is related to the degree of densification which occurs in each stage and to the activation properties produced in the final end product.

The flow of sweep gas introduced in furnace 20 is controlled via a blower, such as 38, and ports 42 in sparger tube 26 during each treatment stage and is capable of delivering mass and volume flows rates sufficient to reduce the accumulation of the evolving volatiles on the surface of the particles. This provides a convenient manner to prevent the particles from adhering to one another or to internal surfaces of the furnace during processing.

During the first and second stage treatment, the sweep gas introduced into the sparger tube consists of ambient air delivered at a predetermined pressure and volume flow rate to the sparger tube 26 by blower 38. The distribution of the flow of sweep gas along the length of the bed of particles is controlled by selecting the spacing and/or size of the orifices provided along the length of the sparger tube 26 in the respective furnace. Exhaust tube 30 includes inlet ports, such as 32, aligned in opposing relationship to the orifices 42 in sparger tube 26 and are connected to a source of negative pressure, such as to the negative pressure side of a suitable exhauster 33. The sweep gas and the evolved volatile components picked up in the sweep gas are drawn out of furnace 20 through the respective ports 32 in close proximity to the same area of the bed which is contacted by the incoming sweep gas flow.

The above described arrangement, wherein the flow path of the sweep gas is not parallel to the path of travel of the particles, is preferred to minimize mixing of the incoming sweep gas with priorly introduced sweep gas which has already contacted the particles of raw material and therefore has an increased water and/or acid content. Providing a fresh supply of sweep gas along the length of the furnace to contact the particles being treated increases the degree of the sweep gas's effectiveness to evaporate and carry away any evolved water and/or acid from the surface of the particles in each of the stages of the process.

While the particular intervals along the length of furnace 20 chosen to introduce and exhaust the sweep gas may vary within reasonable limits in the design of the sparger and exhaust tubes, a design which relies heavily upon sweep gas which has already picked up a significant volatile content from the surface of the particles tends to be less effective and likely will require greater volume flow rates to be employed to assure that excessive accumulation of water and/or acid on the surface of the particles does not occur. Further, since the effectiveness with which the sweep gas carries away the evolved volatives may be significantly decreased if the intervals between outlet ports 42 are too far apart, such a design may have an adverse affect on the uniformity of treatment of the materials and the resulting activation properties of the carbon end product.

A conventional heat exchanger such as 43 is associated with the sweep gas delivered to rotary furnace 20 from a blower 38 to adjust the temperature of the sweep gas to a value which will minimize heat transfer between the sweep gas and the raw materials being treated as earlier described herein.

The blower 38, or any other form of a conventional source for providing a controlled flow of sweep gas, need only develop a pressure sufficient to deliver the predetermined volume flow rate deemed necessary into the sparger tube 26 to assure that an excessive accumulation of water and or acid does not occur on the surface of the particles. In like fashion, exhauster 33 is conventionally designed to remove the incoming flows of sweep gas through the inlet ports of exhaust tube 30 at a rate generally corresponding to the rate of flow introduced via sparger tube 26.

The total volume flow rate of the sweep gas for a given set of process parameters can be adjusted accordingly by appropriately controlling blower 38. The necessary volume flow rate of sweep gas can be relatively easily determined empirically for any particular process parameters chosen in each treatment stage. The volume flow rates noted in the examples described herein are useful guides to any such determination. Generally speaking, if any agglomeration of the particles occurs, an appropriate increase in the volume flow rates of the sweep gas can be made to eliminate this problem and still obtain carbon end product having very good activation properties.

If the process is designed using two or three separate rotary furnaces such as shown at 20, they will have an essentially similar construction and receive heat energy from a suitable heat source, such as gas burners 50, and would be controlled by separate arrays of temperature controllers, such as 52. The sweep gas in the second stage, like the first stage is preferably air, while in the third stage, it preferably is a combustion gas-air mixture having an oxygen content less than that sufficient to cause oxidation of the surface of the feed material at the volume flow rate introduced into the third stage furnace. Tests to date have determined that an oxygen content of about 8 to 10 percent at flow rates sufficient to prevent agglomeration of the particles is suitable to minimize any appreciable oxidation of the particles of raw material being treated. The sweep gas is preferably delivered to the third stage furnace through a sparger tube essentially identical to that described in FIG. 4 and exhausted in the same manner. However, it should be noted that it is generally not necessary to vary the flow rate of the sweep gas during the second and third stage treatment since the rate of evolution of volatiles is much lower and less variable than that which occurs in the initial treatment stage.

As illustrated in the examples described herein, it has been found particularly useful to provide variable rates of heat transfer to the raw materials in the third stage treatment wherein the rate of heat transfer is increased in a plurality of steps, such as shown in FIG. 3. Therefore the ability to more precisely control the rates of heat transfer offers an improved means to selectively vary the desired activation properties to better suit a given application and, very importantly, to optimize certain desirable properties such as, for example, apparent density, ball pan hardness, and activity expressed on a weight and volume basis for a given raw material.

The control of heat transfer by the indirect source of heat offers a very wide range of possibilities to vary the properties of the end product in a manner not possible in the conventional direct fired process. When this feature is combined with the independently supplied and controlled flow of sweep gas, the transfer of heat energy can be varied to achieve a dramatically improved result without introducing the problem of excessive adhesiveness of the particles of raw material which causes undesirable agglomeration during processing. The integrity of the shape of the raw material entering the furnace, as well as the level of consistency of the activation properties obtained, can be more uniformly controlled to provide a very desirable end product. When reconstituted, shaped particles of raw material comprise the starting material, very little or no screening step is required to separate the end product by size using the preferred embodiments of the present invention. Further, no grinding and post treatment pelletizing of powdered carbon is necessary as is required in many commercial scale processes presently employed to provide an economically produced, shaped, activated carbon end product.

The product leaving a third stage furnace such as 20, when treated in accordance with the present invention, retains its original shape to a dramatically improved degree and may be subjected to acid extraction and drying in the conventional manner. While some size separation step may be useful, the percentage of degradation is very low and no substantial agglomeration during processing will occur if the sweep gas volume flow rates are properly determined and applied as described herein.

Further, it should be readily appreciated by those skilled in the art that the capital cost for equipment to practice the method of the present invention is very practical and continuous processing on a commercial scale is readily achievable. The components necessary, standing alone, are readily available on the commercial market or can be readily made or adapted to fit a wide range of highly useful process designs by one skilled in the art following the teachings of the present invention. Further, scale-up from lab or pilot plant scale can be readily achieved in the process of the present invention whereas this is not possible with the conventional direct-fired process. Also a wider range of processing variables may be chosen within a fixed furnace design according to the present invention to produce activated carbon products having quite different predetermined end properties.

For example, as earlier mentioned herein, there are certain variables which may be chosen to affect the properties of the end product in the conventional direct fired process, such as the composition and rate of feed of the raw material, the acid/wood ratio, and the inlet temperature of the combustion gas. However, once these variables are chosen there is very little, if anything, one can do to affect the properties of the end product for a fixed furnace design. There is virtually no effective means to control the rate of heat transfer at selected stages of the activation treatment downstream of the inlet of the combustion gases in any practical fashion approaching that achievable in accordance with the present invention.

In accordance with the present invention, the above variables of the composition of the raw material, acid/wood ratios, and end product temperature are still viable for selection as related to producing certain end product properties. However, upon selecting these variables, the ability to closely control the rates of heat transfer and sweep gas flow rates along particularly selected stages of the activation process provide a dramatically enlarged range of options to produce an end product having different and predetermined properties in a practical manner. Further, the teaching of the present invention substantially enhances the level of the desirable properties achievable for a selected starting raw material composition without changing the selected intrinsic furnace design employed. Therefore, in accordance with the present invention, one has many more choices in the selection of process variables and a more precise degree of control of the activation reaction to tailor the activation process to produce an end product having the optimum level of the most desirable properties to fit a given application in a practical and economical manner.

It is also important to emphasize that the teachings of the present invention include options other than the most preferred embodiment. For example, one may use only the first stage treatment described herein and then transfer the product treated in the first stage to conventional direct-fired processing. This combination would provide an improved process compared to the teachings of the prior art particularly as related to dealing with excessive adhesion, which is most troublesome in the early stages of treatment. Further it would improve control of the level of densification which can be made to occur in this early treatment stage to beneficially affect the properties of the end product.

In a similar manner, one skilled in the art would readily appreciate that the teaching of the present invention could be usefully employed by combining the first stage and part or all of the second stage treatment step in combination with a subsequent conventional direct-fired process step, to complete carbonization and activation. Such a modified method would provide significant advantages relative to controlling the level of densification which can be obtained in these early stages as compared to the prior art methods and contribute to improving the properties of the end product which is subsequently treated conventionally to complete the carbonization and activation of the material.

Without wishing to be bound to any particular theory, it appears from the test data that the degree and the rate of densification which occurs in the earlier stages or in the early portions of a given stage has a significant effect on the level of densification which can be made to occur in the later stages of treatment. Test results suggest, for example, that if less than the maximum achievable densification has occurred in an earlier stage of the process, then the overall percentage of densification which can be made to occur in later treatment stages will be decreased. Therefore it should be readily appreciated that utilizing the teachings of the present invention by employing a combination of only the first treatment stage or the first and second treatment stages with a final conventional direct-fired step can provide significant advantages in producing an improved end product for certain applications. However, it is believed that the most preferred embodiment wherein all three stages of treatment are provided with indirect heating and an independent flow of sweep gas provide the optimum properties and control of the process for most applications requiring a high performance activated carbon product.

Therefore one should readily appreciate that the novel process of the present invention represents a dramatic advance in this art and is advantageous for producing the selected degree of densification relative to the activity level expressed on a weight or a volume basis of the activated carbon end product, and is particularly useful for applications requiring high performance.

While certain preferred embodiments of the present invention have been disclosed in detail, it is to be understood that various modifications may be adopted without departing from the spirit of the invention or the scope of the following claims.

I claim:

1. An improved indirect-fired rotary furnace for chemically activating a carbonaceous raw material impregnated with an activating chemical of the type associated with a source of indirect heat and means to control the rate of heat transferred through rotating furnace walls defining an internal processing chamber of said furnace, the improvement comprising in combination:
    a) means to introduce a sweep gas mounted within a processing chamber including a plurality of outlet ports to distribute a plurality of separate flows of sweep gas, each of said ports located at longitudinally spaced intervals along the axis of rotation of a furnace to direct the sweep gas into contact with a raw material passing through said furnace; said outlet ports operatively connected to a source of sweep gas disposed outside of said furnace; and
    b) means to collect and exhaust said sweep gas introduced by said means defined in paragraph (a) mounted within said furnace processing chamber including a plurality of inlet ports, each of said inlet ports disposed at spaced intervals from one another along the axis of rotation of said furnace and operatively connected to a source of negative pressure disposed outside of said furnace.

2. The rotary furnace defined in claim 1 wherein said means defined in paragraph (a) includes a tubular conduit mounted in fixed relationship relative to said rotating furnace walls and extending parallel to the axis of rotation of said furnace and provided with a plurality of said outlet ports spaced from one another along the longitudinal length of said conduit for directing a flow of sweep gas from said outlet ports into contacting engagement with raw material passing through said furnace in a generally non-parallel direction relative to the axis of rotation of said furnace, said conduit including an inlet part connected to a source of sweep gas.

3. The rotary furnace defined in claim 1 wherein said flow of sweep gas is directed through said processing chamber to said inlet ports of the means defined in paragraph (b) at an angle generally approaching about 90 degrees relative to the axis of rotation of said furnace.

4. A furnace means for the chemical activation of a carbonaceous raw material impregnated with a chemical activation agent comprising, in combination, a furnace mounted for rotation about its longitudinal axis and having a feed inlet and a feed outlet longitudinally spaced from said feed inlet and rotating side walls forming a process chamber; a heat source mounted in close association to the side walls of said furnace to indirectly transfer heat to said chamber through said side walls; a first tubular gas supply conduit fixedly extending longitudinally through said chamber in a non-interfering manner to the rotation of said furnace side walls, said conduit having a plurality of outlet orifices spaced from one another along its length; a source of gas pressure operatively connected to said supply conduit to deliver a predetermined volume flow rate of a selected gas composition into said chamber through said plurality of orifices; an exhaust conduit fixedly extending through said chamber of said furnace in generally parallel, spaced relationship to said supply conduit in a non-interfering manner to the rotation of said furnace, said exhaust conduit provided with a plurality of inlet ports spaced along its length within said chamber; a source of negative pressure operatively connected to an outlet of said exhaust conduit; and control means operatively connected to said heat source for controlling the rate of heat transferred from said heat source through the walls of said furnace to said chamber.

* * * * *